United States Patent
Burbidge et al.

(10) Patent No.: US 8,473,825 B2
(45) Date of Patent: Jun. 25, 2013

(54) EVOLVED UNIVERSAL TERRESTRIAL RADIO ACCESS ACKNOWLEDGED MODE RADIO LINK CONTROL STATUS REPORT FOR SEGMENTED PROTOCOL DATA UNITS

(75) Inventors: Richard Charles Burbidge, Slough (GB); Andrew Mark Earnshaw, Kanata (CA); Takashi Suzuki, Tokyo (JP); Yi Yu, Irving, TX (US); Zhijun Cai, Irving, TX (US); Rose Qingyang Hu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 544 days.

(21) Appl. No.: 12/541,070

(22) Filed: Aug. 13, 2009

(65) Prior Publication Data
US 2011/0041024 A1  Feb. 17, 2011

(51) Int. Cl.
*G06F 11/00* (2006.01)
(52) U.S. Cl.
USPC ............................ 714/782; 714/776; 714/752
(58) Field of Classification Search
USPC .................................................. 714/782, 799
See application file for complete search history.

(56) References Cited

U.S. PATENT DOCUMENTS
8,000,256 B2 * 8/2011 Cha et al. ...................... 370/252
2009/0175206 A1 * 7/2009 Wang et al. ................... 370/310
2010/0111206 A1 * 5/2010 Wu ............................... 375/260

FOREIGN PATENT DOCUMENTS
EP         2086148 A2     8/2009
WO      2008094120 A1    8/2008

OTHER PUBLICATIONS

3GPP TS 36.322 V8.6.0; 3rd Generation Partnership Project; Technical Specification Group Radio Access Network; Evolved Universal Terrestrial Radio Access (E-UTRA) Radio Link Control (RLC) Protocol Specification; Release 8; Jun. 2009; 39 pgs.
PCT International Search Report; PCT Application No. PCT/US2010/035849; Jan. 28, 2011; 4 pgs.
PCT Written Opinion of the International Searching Authority; PCT Application No. PCT/US2010/035849; Jan. 28, 2011, 9 pgs.

* cited by examiner

*Primary Examiner* — Scott Baderman
*Assistant Examiner* — Sarai Butler
(74) *Attorney, Agent, or Firm* — Conley Rose, P.C.; J. Robert Brown, Jr.

(57) ABSTRACT

A method is provided for an acknowledged mode (AM) radio link control (RLC) receiving entity to promote a retransmission of at least a segment of a data protocol data unit (PDU). The method comprises the receiving entity constructing a STATUS PDU such that an AM RLC transmitting entity receiving the STATUS PDU retransmits the segment.

20 Claims, 16 Drawing Sheets

| State Variable | State Variable Name | Value |
|---|---|---|
| VT(A) | Acknowledgement state variable | • Holds the value of the sequence number of the next AMD PDU for which a positive acknowledgement is to be received in-sequence.<br>• Represents the lower edge of the transmitting window.<br>• Initially set to 0.<br>• Updated whenever a positive acknowledgement is received for an AMD PDU with SN=VT(A). |
| VT(MS) | Maximum Send state variable | • Represents the upper edge of the transmitting window.<br>• Equal to VT(A)+AM_Window_Size. |
| VT(S) | Send state variable | • Holds the value of the sequence number to be assigned for the next newly-generated AMD PDU.<br>• Initially set to 0.<br>• Updated whenever the AM RLC entity generates a new AMD PDU.<br>• Note that VT(S) can never become greater than VT(MS). |

Figure 2

| State Variable | State Variable Name | Value |
|---|---|---|
| VR(R) | Receive state variable | - Holds the value of the SN following the last in-sequence completely received AMD PDU. This implies that the AMD PDU corresponding to VR(R) has either not been received or only segments of it have so far been received.<br>- Represents the lower edge of the receiving window.<br>- Initially set to 0, and is updated whenever an AMD PDU with SN=VR(R) is received. |
| VR(MR) | Maximum acceptable Receive state variable | - The SN of the first AMD PDU that is beyond the receiving window.<br>- Represents the upper edge of the receiving window.<br>- Equal to VR(R)+AM_Window_Size. |
| VR(H) | Highest received state variable | - Equal to the sequence number immediately following the sequence number of the highest numbered received AMD PDU (or AMD PDU segment).<br>- Initially set to 0. |

Figure 4

| Field Label | Field Name | Field Description | Relevant Section in 3GPP TS 36.322 |
|---|---|---|---|
| ACK_SN | Acknowledgement Sequence Number | Indicates the sequence number of the next not-received AMD PDU which is not reported elsewhere within the STATUS PDU as missing (i.e. with a NACK_SN). | 6.2.2.14 |
| CPT | Control PDU Type | Indicates the type of the RLC control PDU, as defined in Table 6.2.2.13-1 of 3GPP TS 36.322. A value of 000 is used for a STATUS PDU. | 6.2.2.13 |
| D/C | Data/Control | Indicates whether the AM RLC PDU is an RLC data PDU or RLC control PDU.<br>• D/C=0: Control PDU<br>• D/C=1: Data PDU<br>This field is set to 0 for a STATUS PDU. | 6.2.2.9 |
| E1 | Extension bit 1 | This extension bit indicates whether a NACK_SN / E1 / E2 combination follows the current portion of the PDU header.<br>• E=0: A NACK_SN / E1 / E2 combination does not follow the current part of the PDU header<br>• E=1: A NACK_SN / E1 / E2 combination follows the current part of the PDU header | 6.2.2.15 |
| E2 | Extension bit 2 | This extension bit indicates whether an SOstart / SOend combination follows the current NACK_SN.<br>• E=0: An SOstart / SOend combination does not follow the current NACK_SN<br>• E=1: An SOstart / SOend combination follows the current NACK_SN | 6.2.2.17 |
| NACK_SN | Negative Acknowledgement SN | Indicates the sequence number of a specific AMD PDU that has been detected as partially (i.e. at least one segment is missing) or fully lost at the receiving AM RLC entity. | 6.2.2.16 |
| Padding | Padding | From 1 to 7 bits of padding may be required in the STATUS PDU to ensure that the STATUS PDU length will always be byte-aligned. Padding bits must be set to 0. | 6.2.1.6 |
| SOend | Segment Offset end | Indicates the position (in bytes within the Data field of the AMD PDU) of the last byte of a missing segment of the AMD PDU. The special value of all binary 1s (i.e. 0x7FFF) is used to indicate that all bytes up to and including the last byte of the AMD PDU are missing. | 6.2.2.19 |
| SOstart | Segment Offset start | Indicates the position (in bytes within the Data field of the AMD PDU) of the first byte of a missing segment of the AMD PDU | 6.2.2.18 |

Figure 7

| SN=5 | X | | | } 840 |
| SN=6 | √ | | | |
| SN=7 X | √ | | X | 830 |
| SN=8 | √ | | | |
| SN=9 | √ | | | |
| SN=10 | X | | | } 850 |
| SN=11 | X | | | |

EVOLVED UNIVERSAL TERRESTRIAL RADIO ACCESS ACKNOWLEDGED MODE RADIO LINK CONTROL STATUS REPORT FOR SEGMENTED PROTOCOL DATA UNITS

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network nodes. When a UE is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a SIP session.

In traditional wireless telecommunications systems, transmission equipment in a base station transmits signals throughout a geographical region known as a cell. As technology has evolved, more advanced network access device has been introduced that can provide services that were not possible previously. This advanced network access device might include, for example, an evolved node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE eNB, or any other system or device, that can provide a UE with access to other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a table of state variables maintained by a transmitting entity in a PDU packet transmission procedure according to an embodiment of the disclosure.

FIG. 4 is a table of state variables maintained by a receiving entity in a PDU packet transmission procedure according to an embodiment of the disclosure.

FIG. 7 is a table of descriptions of fields in a STATUS PDU according to an embodiment of the disclosure.

FIG. 8 is an illustration of the status of the receiver buffer showing an RLC PDU with a segment that was not received correctly according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Evolved Universal Terrestrial Radio Access (E-UTRA) Radio Link Control (RLC) protocol is described in the 3rd Generation Partnership Project (3GPP) Technical Specification (TS) 36.322. This protocol specifies the Layer 2 retransmission protocol for use in E-UTRA systems. The RLC protocol has three modes of operation: Acknowledged Mode (AM), Unacknowledged Mode (UM) and Transparent Mode (TM). The discussion herein relates to the AM mode of operation, wherein entities send acknowledgements and negative acknowledgements to each other and retransmit data when necessary. The protocol is defined between peer AM RLC entities that might reside in an access device and a UE. Each peer RLC entity has a receiving side and a transmitting side.

When an RLC Protocol Data Unit (PDU) needs to be retransmitted, it is possible for the PDU to be segmented and for each RLC PDU segment to be retransmitted separately. This may be necessary if the radio link quality has worsened since the previous transmission of the RLC PDU and will no longer support the transmission of same sized RLC PDU, or if the available amount of transmission resources has been reduced, for example because of heavier cell loading.

The receiving side of an RLC entity generates RLC STATUS reports and sends them to the transmitting side of the peer RLC entity. The RLC STATUS reports indicate the sequence numbers (SNs) of RLC PDUs that have been received correctly and incorrectly. If an RLC PDU has been segmented, the RLC STATUS report indicates which segments of the RLC PDU have been received correctly and incorrectly. After receiving an RLC STATUS report, the transmitting side of the peer RLC entity retransmits any RLC PDUs and/or RLC PDU segments that the receiving side did not receive. This process of the receiving side stating in the STATUS report the PDUs and/or PDU segments that were not received and the transmitting side retransmitting those PDUs and/or PDU segments might continue until the receiving side receives all of the transmitted PDUs and PDU segments.

Figure 1:
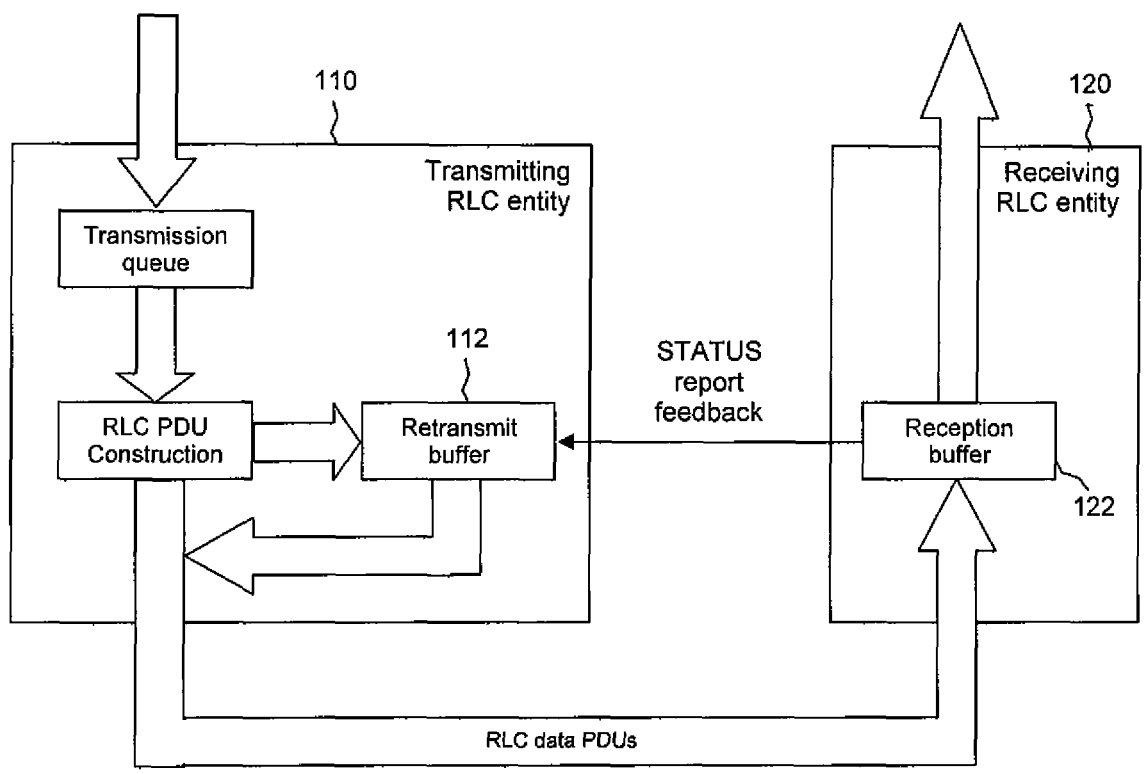
FIG. 1 is a block diagram of a PDU packet transmission procedure according to an embodiment of the disclosure.

This process is illustrated in the simplified block diagram shown in FIG. 1. New RLC Service Data Units (SDUs) are queued up at a transmitting RLC entity 110, which might be in a UE or in an access device. As transmission opportunities arise, RLC PDUs are constructed for transmission. At the same time, these RLC PDUs are saved in a retransmission buffer 112 in case they need to be resent. Any RLC PDUs that are negatively acknowledged by a receiving RLC entity 120, which might be in a UE or in an access device, will then be retrieved from the retransmission buffer 112 and retransmitted. Received RLC PDUs are stored in a reception buffer 122 at the receiving RLC entity 120, which periodically and/or upon request by the transmitting RLC entity 110 provides feedback in the form of STATUS reports to indicate which RLC PDUs have and have not been successfully received.

3GPP TS 36.322 specifies that the state variables described in the table in FIG. 2 are to be maintained by the transmitting side of an AM RLC entity for AMD PDU (re)transmission purposes. The term AMD PDU in the table refers to an AM RLC Data PDU. The transmitting window size (AM_Window_Size) is equal in length to half of the total sequence number space. AM RLC uses 10-bit sequence numbers, which results in an AM_Window_Size value of 512. All arithmetic operations and comparisons on RLC sequence numbers are performed using an appropriate modulus corresponding to the configured sequence number range (i.e., 1024 for 10-bit AM RLC sequence numbers) and a modulus base calculated as a function of certain state variables and constants. This process is described in 3GPP TS 36.322.

Figure 3:
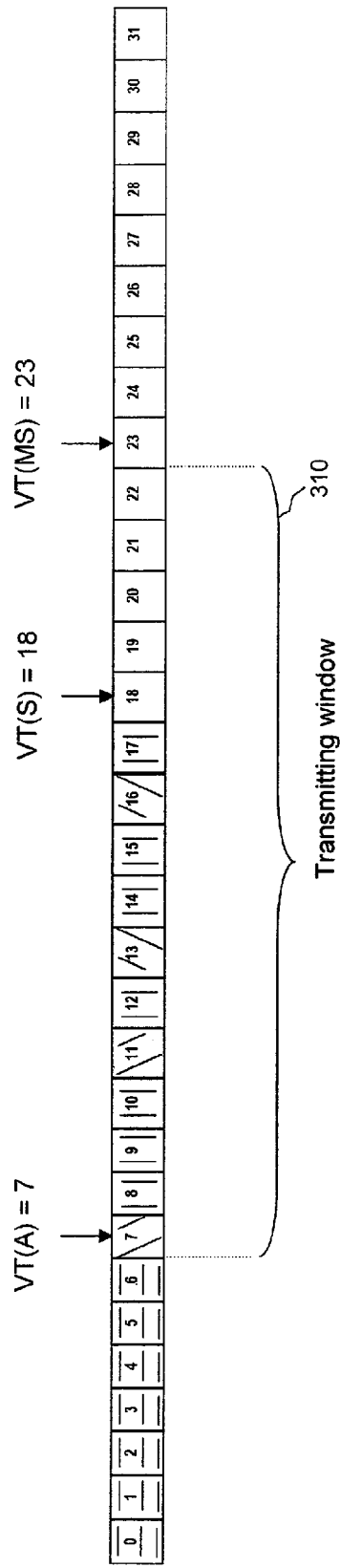
FIG. 3 is an example of an RLC transmitting window according to an embodiment of the disclosure.

FIG. 3 shows an example AM RLC transmitting window 310, as defined by the state variables described in the table in FIG. 2. To keep this example simple, a 5-bit sequence number (rather than the 10-bit AM sequence number) is assumed. Boxes 0-6 in the diagram represent RLC PDUs that have been transmitted and acknowledged and that now fall outside the transmitting window 310. Boxes 8, 9, 10, 12, 14, 15, and 17 represent RLC PDUs that have been transmitted and acknowledged, but which still fall inside the transmitting window 310. Boxes 13 and 16 represent RLC PDUs that have been transmitted but which were negatively acknowledged (and hence require Layer 2 retransmission). Boxes 7 and 11 represent RLC PDUs that have been transmitted and that have some PDU segments that have been acknowledged and some PDU segments that have not been acknowledged. Finally, boxes 18-31 represent RLC PDUs that have not yet been formed and transmitted.

VT(A) at box 7 represents the lower edge of the transmitting window 310 and is the first RLC PDU that still requires full acknowledgement. VT(S) at box 18 represents the sequence number for the next new RLC PDU that will be transmitted. VT(MS) at box 23 is half the total sequence number range higher than VT(A) (16 in this 5-bit example) and represents the upper edge of the transmitting window 310. If VT(S) ever equals VT(MS), then no new RLC PDUs may be sent until VT(MS) increases.

A sequence number (SN) falls within the transmitting window if $VT(A) \leq SN < VT(MS)$. If this condition is not satisfied, then the sequence number falls outside the transmitting window. 3GPP TS 36.322 specifies that an AM RLC transmitter shall not deliver to the Medium Access Control (MAC) any RLC data PDU whose sequence number falls outside the transmitting window. This implies that an RLC PDU that falls below the transmitting window will not be retransmitted, even if a new negative acknowledgement is received for it. In addition, if the transmitting window becomes full (i.e., VT(S) becomes equal to VT(MS)), the AM RLC entity may not transmit any new RLC PDUs until the lower edge of the transmitting window is advanced. This condition is termed "window stalling", and 3GPP TS 36.322 specifies specific actions that are to be taken to address this situation if it ever arises.

At the receiving AM RLC entity, RLC PDUs may be received out of order due to lower layer hybrid automatic repeat request (HARQ) retransmissions. In addition, various RLC PDUs and/or RLC PDU segments may be missing due to HARQ retransmission failure. A reception buffer is maintained by the receiving AM RLC entity in order to recover the original ordering of RLC PDUs.

3GPP TS 36.322 specifies that the state variables described in the table in FIG. 4 are to be maintained by the receiving side of an AM RLC entity for RLC PDU reordering purposes. The receiving window size (AM_Window_Size) is equal in length to half of the total sequence number space. AM RLC uses 10-bit sequence numbers, which results in an AM_Window_Size value of 512.

A specific sequence number SN falls within the receiving window if $VR(R) \leq SN < VR(MR)$, and outside the receiving window otherwise. All arithmetic operations and comparisons on RLC sequence numbers are performed using an appropriate modulus corresponding to the configured sequence number range (i.e., 1024 for 10-bit AM RLC sequence numbers) and a modulus base calculated as a function of certain state variables and constants. This process is described in 3GPP TS 36.322.

Figure 5:
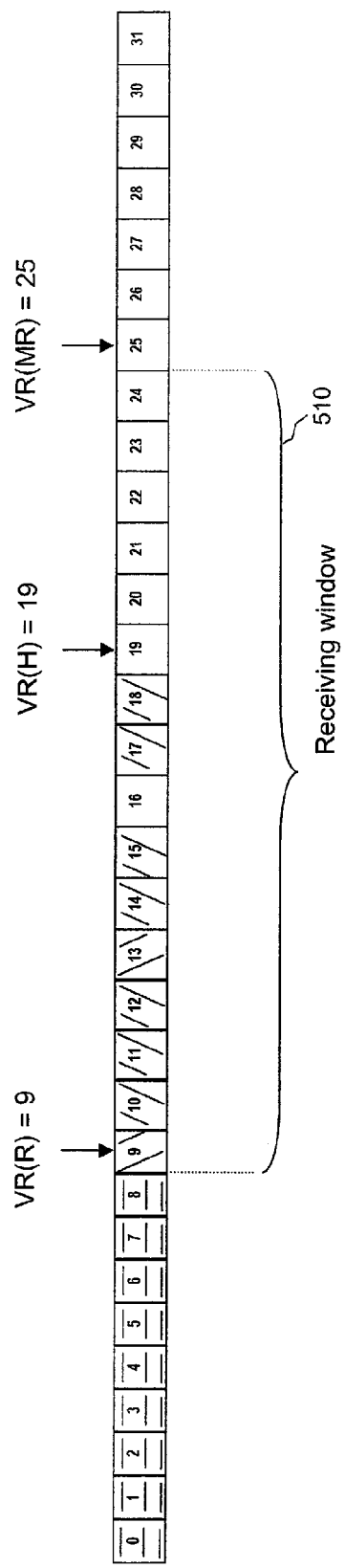
FIG. 5 is an example of an RLC receiving window according to an embodiment of the disclosure.

FIG. 5 illustrates an example AM RLC receiving window 510 with the relevant state variables from the table in FIG. 4 also being shown in the diagram. This example assumes a 5-bit sequence number purely for reasons of illustrative simplicity. Boxes 0-8 represent AMID PDUs that have been completely processed by the reception buffer and released for RLC SDU reassembly. Boxes 10, 11, 12, 14, 15, 17, and 18 represent AMD PDUs that have been completely received but which are still being held in the reception buffer. Boxes 9 and 13 represent AMID PDUs that have been partially received (i.e., at least one AMD PDU segment has been received). Boxes 16 and 19-31 represent AMD PDUs that have not been received. As shown in the diagram, VR(R) at box 9 represents the first AMID PDU that has not been completely received, VR(H) at box 19 represents the sequence number following the highest received or partially received AMD PDU, and VR(MR) at box 25 represents the upper edge of the receiving window 510, which is a fixed distance (16 for this 5-bit SN example) above the lower edge of the receiving window 510. The AM RLC receiving window 510 is defined by the window's lower edge VR(R) and is pushed along when VR(R) increases in value. The receiving window 510 cannot advance unless VR(R) advances.

Figure 6:
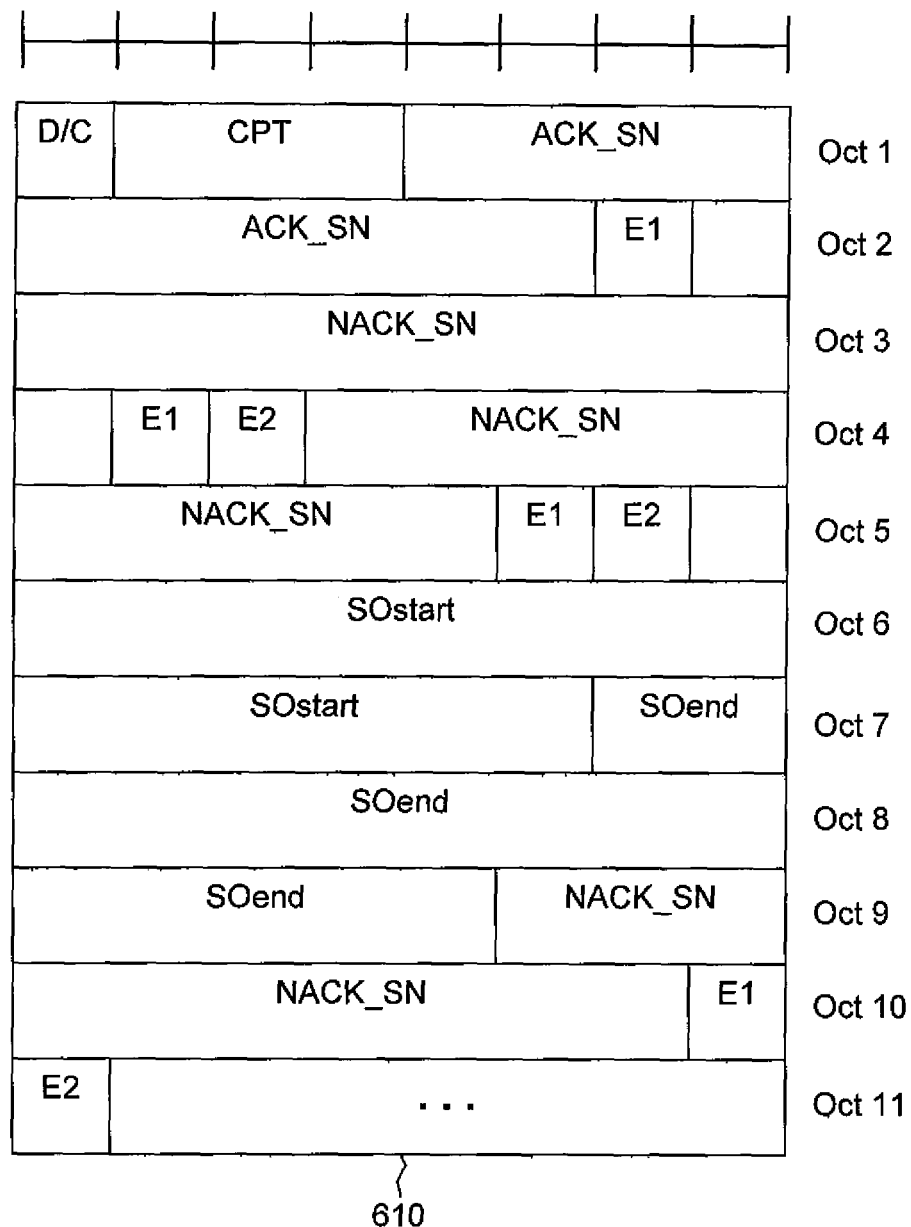
FIG. 6 is a diagram of a STATUS PDU according to an embodiment of the disclosure.

Information about successfully and unsuccessfully received RLC PDUs is fed back from a receiving AM RLC entity to the transmitting AM RLC entity via a STATUS report or STATUS control PDU. FIG. 6 illustrates the format of such a STATUS PDU 610, with a description of each field being given in the table in FIG. 7. The length of a STATUS PDU is variable, depending upon how much acknowledgement information is included in it.

The ACK_SN field in the STATUS PDU is mandatory. Zero or more NACK_SN fields may optionally also be present within the STATUS PDU. Each NACK_SN field that is present may optionally have missing segment information associated with it. The missing segment information comprises a segment offset start (SOstart) and a segment offset end (SOend) which indicate the byte numbers within the PDU corresponding to the start and end of a missing segment of the PDU. If the receiving AM RLC entity is missing multiple non-contiguous segments of an AMD PDU, it may include multiple NACK_SN fields with the same sequence number value, but with different segment offset fields. According to the rules for constructing a STATUS PDU as described in 3GPP TS 36.322, multiple NACK_SN fields within the same STATUS PDU can be expected to be in ascending order, and multiple NACK_SN fields with the same sequence number value can be expected to be in ascending byte segment order.

When a transmitting AM RLC entity receives a STATUS PDU, it interprets that all AMD PDUs with sequence numbers less than ACK_SN have been successfully received, with the possible exception of any AMD PDUs and/or AMD PDU segments that are specifically identified via a NACK_SN (and optional segment offset information) as having not been successfully received. That is, if a STATUS PDU does not list any data PDUs or data PDU segments that were not successfully received, the transmitting entity assumes that all data PDUs and data PDU segments with sequence numbers less than ACK_SN were successfully received. If a STATUS PDU does list one or more data PDUs and/or data PDU segments that were not successfully received, the transmitting entity assumes that all data PDUs and data PDU segments were successfully received with the exception of the listed data PDUs and/or data PDU segments. The listed data PDUs and/or data PDU segments would then be retransmitted.

The wording in Section 5.2.3 of 3GPP TS 36.322 describing the construction of a STATUS PDU is as follows:

| 5.2.3 Status Reporting |
|---|
| <. . . removed text . . .> |
| When constructing a STATUS PDU, the AM RLC entity shall: |
|     for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer: |
|         for an AMD PDU for which no byte segments have been received yet: |

| 5.2.3 Status Reporting |
|---|
|         include in the STATUS PDU a NACK_SN which is set to the SN of the AMD PDU; |
|     for a continuous sequence of byte segments of a partly received AMD PDU that have not been received yet: |
|         include in the STATUS PDU a set of NACK_SN, SOstart and SOend |
|     set the ACK_SN to the SN of the next not received RLC Data PDU which is not indicated as missing in the resulting STATUS PDU. |

It is also useful to reference the following contents of Section 6.2.2.14 of 3GPP TS 36.322, which state how a STATUS report shall be interpreted by the transmitting RLC entity.

| 6.2.2.14 Acknowledgement SN (ACK_SN) field |
|---|
| Length: 10 bits. |
| The ACK_SN field indicates the SN of the next not received RLC Data PDU which is not reported as missing in the STATUS PDU. When the transmitting side of an AM RLC entity receives a STATUS PDU, it interprets that all AMD PDUs up to but not including the AMD PDU with SN = ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend. |

The wording quoted above from Section 5.2.3 of 3GPP TS 36.322 can be paraphrased into simpler language as:

Begin with the lowest sequence numbered RLC PDU that has not yet been received or which has been only partially received.

While there is still room in the STATUS report and there are still transmitted PDUs that the receiver knows are missing or partially missing:

If the current RLC PDU is completely missing then:

Include a NACK_SN in the STATUS report for that RLC PDU.

Advance to the next missing or partially missing RLC PDU.

If the current RLC PDU has been partially received (i.e., at least one segment has been received for that RLC PDU) then:

Include a NACK_SN, SOstart and SOend for the current RLC PDU and current missing segment in that RLC PDU.

If the current RLC PDU has at least one more missing segment that has not yet been described within the STATUS report then:

Advance to the next missing segment within the same RLC PDU.

Else:

Advance to the next missing or partially missing RLC PDU.

Set ACK_SN to the sequence number of the next not received RLC Data PDU which is not already indicated as missing in the resulting STATUS PDU.

A problem might occur when an RLC PDU is missing multiple non-contiguous segments, but there is insufficient room in the STATUS PDU to specify all of the missing segments. In such a situation, the transmitting AM RLC entity may receive incorrect information about which RLC PDU segments have been correctly received at the receiving AM RLC entity and which RLC PDU segments have not been correctly received.

FIG. 8 provides an illustrative example to demonstrate this potential problem. A transmitting entity made an initial transmission to a receiving entity, and the receiving entity sent the transmitting entity a first STATUS report specifying the PDUs and/or PDU segments that were not successfully received. The transmitting entity then retransmitted the specified PDUs and/or PDU segments, and the receiving entity sent the transmitting entity a second STATUS report specifying the PDUs and/or PDU segments that were not successfully received in the retransmission. The table in FIG. 8 represents the status of a portion of the receiver buffer when this second STATUS report is generated. In this case, as a result of the first STATUS report, the RLC PDU 800 with SN=7 required an RLC retransmission and happened to be retransmitted as three PDU segments. The second segment 820 of these three segments was received correctly, but the first segment 810 and third segment 830 were not.

When a STATUS report is triggered, it fills the available transmission space as much as possible. It is possible for a STATUS report to fill up before all the information that needs to be included is included. In this particular example, the STATUS report fills up after including feedback (NACK_SN, SOstart, SOend) for the first missing segment 810 of the RLC PDU 800 with SN=7. Consequently, there is insufficient room to include the feedback for the next missing segment 830 of the same RLC PDU 800 (with SN=7), which would require an additional set of NACK_SN, SOstart, and SOend fields. That is, the fact that the third segment 830 was not successfully received is not included in the STATUS report.

The ACK_SN will be set to the "next not received RLC Data PDU which is not indicated as missing in the resulting STATUS PDU" as described in Section 5.2.3 of 3GPP TS 36.322. Consequently, the resulting STATUS report will contain:

ACK_SN=10|NACK_SN=5|NACK_SN=7/SOstart/ SOend

That is, the ACK_SN indicates that the RLC PDU 850 with SN=10 is the next not received RLC PDU that was not already indicated to be not received. The first NACK_SN indicates that the entire PDU 840 with SN=5 was not received. The second NACK_SN indicates that the first segment 810 of the PDU 800 with SN=7 was not received and gives the starting and ending points of that segment. The fact that the third segment 830 of the PDU 800 with SN=7 was not received is not included in the STATUS report because there is insufficient space in the STATUS report for that information.

The transmitting RLC entity will interpret this received STATUS report as described in Section 6.2.2.14 of 3GPP TS 36.322 (quoted above). That is, since no NACK_SN regarding the third segment 830 was included in the STATUS report, the transmitting RLC entity will incorrectly assume that the third segment 830 was received correctly.

The consequence of this incorrect assumption depends on how the transmitter manages the discarding of RLC PDUs and RLC PDU segments that are indicated by a STATUS report to be successfully received. If the transmitter does not discard RLC PDU segments that are indicated as received correctly (but only discards transmitted RLC PDUs once VT(A) (the bottom of the transmit window) has been advanced beyond the sequence number of that RLC PDU), then a subsequent STATUS report may indicate the missing RLC PDU segment and this segment will be retransmitted. Hence, the situation will be recovered, albeit with some slightly longer delay.

However, if the transmitting RLC entity does discard RLC PDU segments that (from the transmitter's viewpoint) have been indicated as received correctly, then the transmitter would be unable to retransmit that missing segment of the RLC PDU even if a subsequent STATUS report requests that it should be retransmitted, since the data would no longer be available within the transmitter's retransmission buffer. Furthermore, the currently-specified error handling mechanisms would not detect that a problem has occurred. The transmitter would likely consider that the STATUS report contains invalid values, as it contains a request to retransmit data that had previously been indicated as correctly received. The behavior specified in 3GPP TS 36.322 in this case is to discard the STATUS report. Also, if no retransmission can occur, then the maximum number of retransmissions will not be reached and Radio Link Failure will not be triggered. Hence, the consequence is that the RLC protocol would stall with no means to recover.

Whether the transmitter discards transmitted PDUs is not specified by the RLC protocol specification, but is left up to implementation. However, it is possible that a particular implementation could discard data as soon as an RLC STATUS report indicating successful reception is received, so it may be desirable for the RLC protocol to be able to handle this possibility and thus prevent the consequence described above. While this scenario may be expected to occur rarely, the consequence if it does occur is serious.

In an embodiment, seven possible solutions to the identified problem are provided. Proposed changes to 3GPP TS 36.322 corresponding to each of the seven possible solutions are also provided.

In a first solution, if the constructed STATUS report does not contain information about all missing segments of an RLC PDU (which would correspond to the final NACK_SN in the STATUS PDU), then the ACK_SN field is set equal to the sequence number of that RLC PDU, rather than to the sequence number of the "next not received RLC Data PDU which is not indicated as missing in the resulting STATUS PDU". When the transmitting RLC entity receives the STATUS report, it can deduce whether all missing segments of the RLC PDU with sequence number equal to the final NACK_SN in the STATUS report have been described within the STATUS report by checking to see if the ACK_SN value is or is not equal to the final NACK_SN value.

In other words, when information about a missing segment is not included in a STATUS report, the receiving RLC entity sets the ACK_SN to the sequence number of the PDU that has the missing segment. In the example of FIG. 8, the ACK_SN would be set to 7. The STATUS report would still include a NACK_SN for that PDU, and that PDU is associated with the last NACK_SN in the STATUS report. Therefore, when the sequence number of the PDU associated with the last NACK_SN is equal to the value of the ACK_SN, the transmitting entity knows that the receiving entity did not successfully receive all of the segments in the PDU associated with the last NACK_SN.

One possible drawback of this method is that the transmitting RLC entity may have to retain RLC PDUs in its retransmission buffer that have actually been correctly received by the receiving RLC entity. The ACK_SN field would be set to the sequence number of the RLC PDU that still has unreported missing segments, and the correctly received segments with higher sequence numbers that have been successfully received cannot be indicated as successfully received in the STATUS report. In the example of FIG. 8, as the ACK_SN would be set to 7, the PDUs with SN=8 and 9 are not indicated as successfully received by this STATUS report. A subsequent STATUS report would have to be transmitted in order to indicate successful reception of these PDUs.

To implement this solution, Section 5.2.3 of 3GPP TS 36.322 could be revised as follows:

---
5.2.3 Status reporting
---

<... removed text ...>
When constructing a STATUS PDU, the AM RLC entity shall:
    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:
        for an AMD PDU for which no byte segments have been received yet:
            include in the STATUS PDU a NACK_SN which is set to the SN of the AMD PDU;
        for a continuous sequence of byte segments of a partly received AMD PDU that have not been received yet:
            include in the STATUS PDU a set of NACK_SN, SOstart and SOend;
    if the final NACK_SN field in the STATUS PDU refers to a partly received AMD PDU and there is a not received segment of this AMD PDU which is not indicated in the STATUS PDU:
        set the ACK_SN to the SN of this partly received AMD PDU;
    else, set the ACK_SN to the SN of the next not received RLC Data PDU which is not indicated as missing in the resulting STATUS PDU.

Alternatively, Section 5.2.3 of 3GPP TS 36.322 could be revised as follows:

---
5.2.3 Status reporting
---

<... removed text ...>
When constructing a STATUS PDU, the AM RLC entity shall:
    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:
        for an AMD PDU for which no byte segments have been received yet:
            include in the STATUS PDU a NACK_SN which is set to the SN of the AMD PDU;
        for a continuous sequence of byte segments of a partly received AMD PDU that have not been received yet:
            include in the STATUS PDU a set of NACK_SN, SOstart and SOend
    set the ACK_SN to the SN of the first not received RLC Data PDU or RLC DATA PDU segment which is not indicated as missing in the resulting STATUS PDU.

In a third alternative, Section 5.2.3 of 3GPP TS 36.322 could be revised as follows:

---
5.2.3 Status reporting
---

<... removed text ...>
    When constructing a STATUS PDU, the AM RLC entity shall:
        for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:
            for an AMD PDU for which no byte segments have been received yet:
                include in the STATUS PDU a NACK_SN which is set to the SN of the AMD PDU;
            for a continuous sequence of byte segments of a partly received AMD PDU that have not been received yet:
                include in the STATUS PDU a set of NACK_SN, ---
5.2.3 Status reporting (continued)
---

SOstart and SOend
    set the ACK_SN to the SN of the first not received RLC Data PDU which is not fully indicated as missing in the resulting STATUS PDU.

To further implement this solution, Section 6.2.2.14 of 3GPP TS 36.322 could be revised as follows:

---
6.2.2.14 Acknowledgement SN (ACK_SN) field
---

Length: 10 bits.
The ACK_SN field indicates the SN of the first not received RLC Data PDU or RLC DATA PDU segment which is not reported as missing in the STATUS PDU. When the transmitting side of an AM RLC entity receives a STATUS PDU, it interprets that all AMD PDUs up to but not including the AMD PDU with SN = ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend.

Figure 9:
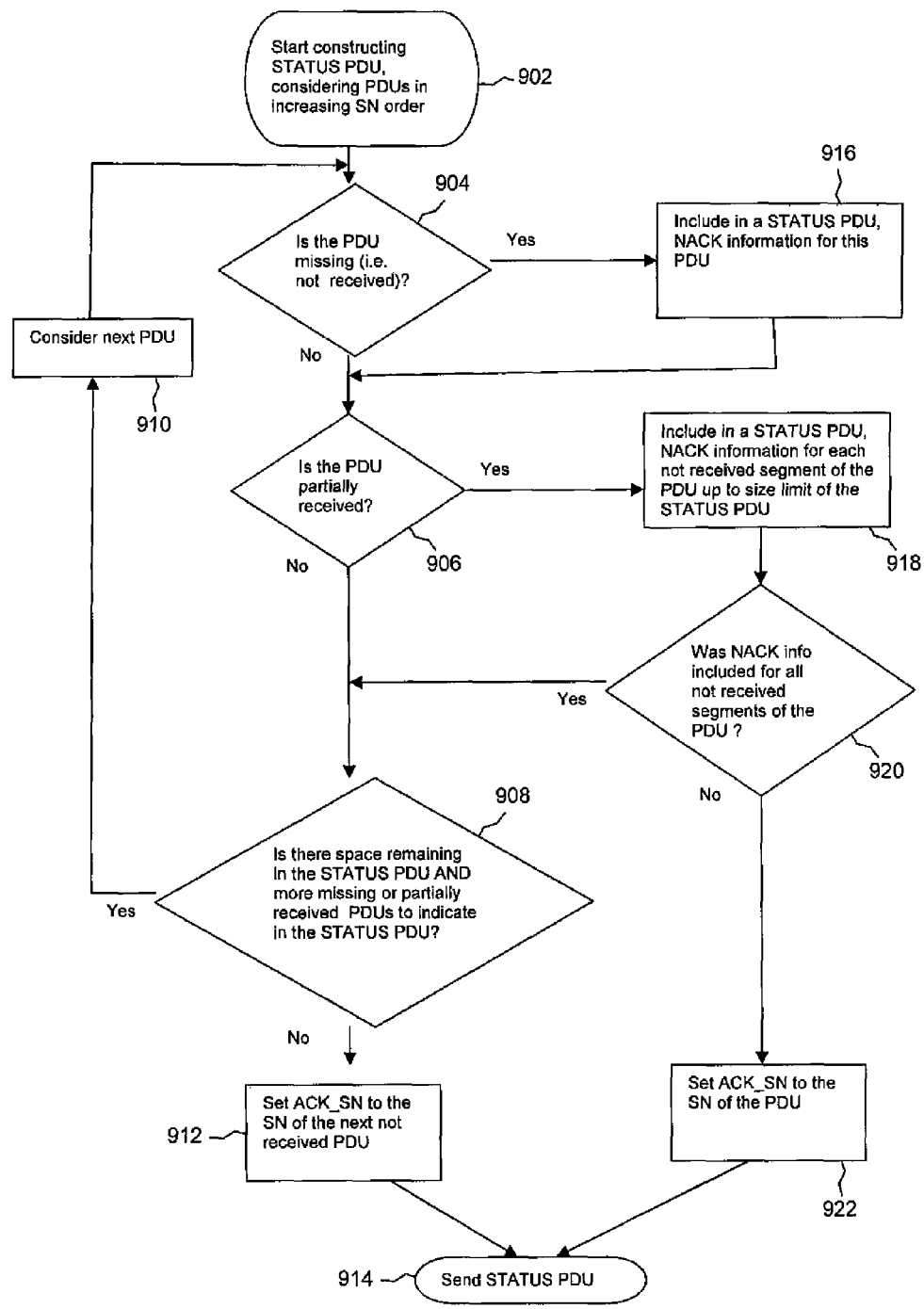
FIG. 9 illustrates a method for an acknowledged mode radio link control receiving entity to promote the retransmission of a segment of a data protocol data unit according to an embodiment of the disclosure.

FIG. 9 illustrates an embodiment of a method for an acknowledged mode radio link control receiving entity to promote a retransmission of at least a segment of a data protocol data unit according to this solution. At block 902, the receiving entity starts constructing a STATUS PDU, considering PDUs in increasing SN order. At block 904, it is determined whether the PDU is missing (i.e., not received). If the answer is "no", the flow proceeds to block 906, where it is determined whether the PDU was partially received. If the answer is "no", the flow proceeds to block 908, where it is determined whether there is space remaining in the STATUS PDU and whether there are more missing or partially received PDUs to indicate in the STATUS PDU. If the answer is "yes", the flow proceeds to block 910, where the next PDU is considered. The flow then returns to block 904. If the answer is "no" at block 908, the flow proceeds to block 912, where the ACK_SN is set to the SN of the next not received PDU. The flow then proceeds to block 914, where the STATUS PDU is sent.

If the answer is "yes" at block 904, the flow proceeds to block 916, where NACK information for this PDU is included in a STATUS PDU. The flow then returns to block 906. If the answer is "yes" at block 906, the flow proceeds to block 918, where NACK information for each not received segment of the PDU up to the size limit of the STATUS PDU is included in a STATUS PDU. The flow proceeds to block 920, where it is determined whether NACK information was included for all not received segments of the PDU. If the answer is "yes", the flow returns to block 908. If the answer is "no", the flow proceeds to block 922, where the ACK_SN field in the STATUS PDU is set to the sequence number of the PDU. The flow then proceeds to block 914, where the STATUS PDU is sent.

In a second solution, information for a partially received RLC PDU is only included in a STATUS report if there is sufficient space in the STATUS report to include information about all of the missing segments of that RLC PDU. If all of the missing segments cannot be described (due to insufficient resource space), then a NACK_SN field is not included for that RLC PDU, and the ACK_SN field is set equal to the sequence number of that RLC PDU. This approach results in less information being provided to the transmitting RLC entity than does the approach described in the first solution.

In other words, the receiving RLC entity sets the ACK_SN to the sequence number of the PDU that includes the missing segment as in the first solution. In this second solution, however, the STATUS report does not include a NACK_SN for that PDU.

To implement this solution, Section 5.2.3 of 3GPP TS 36.322 could be revised as follows:

---
5.2.3 Status reporting
---
<... removed text...>
When constructing a STATUS PDU, the AM RLC entity shall:
    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer or it is not possible to add a full description of all missing AMD PDU segments for a partly received AMD PDU to the STATUS PDU:
        for an AMD PDU for which no byte segments have been received yet:
            include in the STATUS PDU a NACK_SN which is set to the SN of the AMD PDU;
        for an AMD PDU that has been partly received:
            if all sets of NACK_SN, SOstart, SOend for this partly received AMD PDU fit within the STATUS PDU:
                include in the STATUS PDU a set of NACK_SN, SOstart and SOend for each continuous sequence of byte segments of this partly received AMD PDU;
            else a NACK_SN field is not included for that RLC PDU.
        Set the ACK_SN to the SN of this RLC PDU.
If ACK_SN is not set yet, then set the ACK_SN to the SN of the next not received RLC Data PDU which is not indicated as missing in the resulting STATUS PDU.

---

Figure 10:
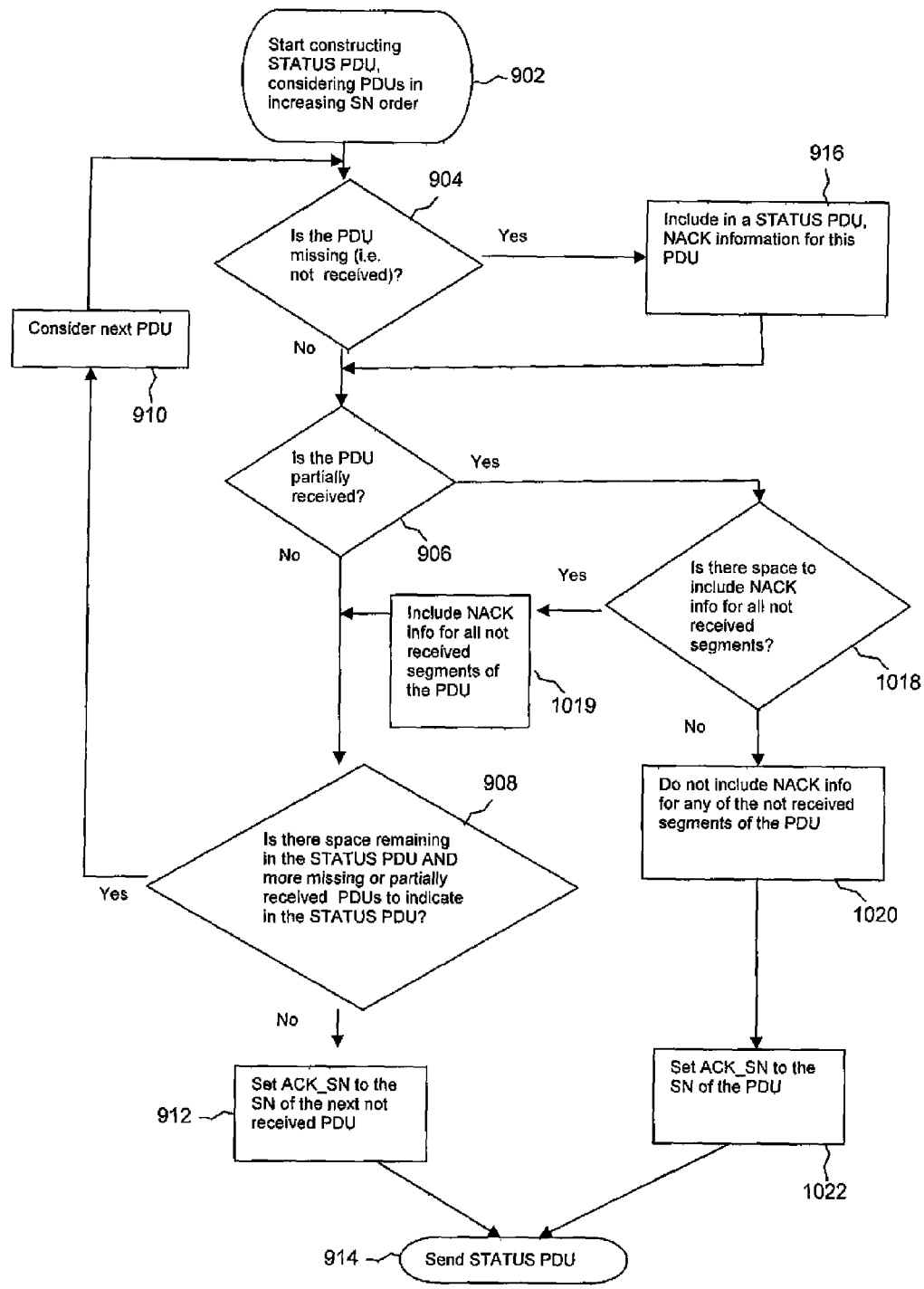
FIG. 10 illustrates an alternative method for an acknowledged mode radio link control receiving entity to promote the retransmission of a segment of a data protocol data unit according to an embodiment of the disclosure.

FIG. 10 illustrates an embodiment of a method for an acknowledged mode radio link control receiving entity to promote a retransmission of at least a segment of a data protocol data unit according to this solution. Blocks 902 through 916 are the same as in FIG. 9 and will not be described again here. If the answer is "yes" at block 906, the flow proceeds to block 1018, where it is determined whether there is space to include NACK information for all not received segments. If the answer is "yes", the flow proceeds to block 1019 where the NACK information for all the not received segments of the PDU is included in the STATUS PDU and then the flow returns to block 908. If the answer is "no", the flow proceeds to block 1020, where NACK information for the not received segments of the PDU is not included. The flow then proceeds to block 1022, where the ACK_SN is set to the SN of the PDU.

In a third solution, the transmitting side of an RLC entity may keep an entire RLC PDU for possible retransmission when any portion of that RLC PDU is indicated within a STATUS report as not successfully received. This ensures that if the receiver did not completely describe all of the missing segments of an RLC PDU within a STATUS report, then the transmitter will still have the data available for possible retransmission in the future.

A slight modification to this approach would be that the transmitting side of an RLC entity only has to keep an entire RLC PDU for possible retransmission when any portion of that RLC PDU is indicated within a STATUS report as not successfully received and that RLC PDU corresponds to the final NACK_SN field in the STATUS report. Based on the current procedural description for constructing a STATUS report, any missing portions of any of the RLC PDUs corresponding to earlier NACK_SN fields in the STATUS report must have been completely described. Consequently, any of those RLC PDU segments that had been indicated as success- fully acknowledged by the receiver could be discarded by the transmitter. A possible incomplete description of missing RLC PDU segments can only occur for the RLC PDU whose sequence number corresponds to the final NACK_SN field in the STATUS report.

Implementation of this solution might entail revisions to Section 5.2.1 of 3GPP TS 36.322. Currently, this section is worded as follows:

---
5.2.1 Retransmission
---
The transmitting side of an AM RLC entity can receive a negative acknowledgement (notification of reception failure by its peer AM RLC entity) for an AMD PDU or a portion of an AMD PDU by the following:
    STATUS PDU from its peer AM RLC entity.
When receiving a negative acknowledgement for an AMD PDU or a portion of an AMD PDU by a STATUS PDU from its peer AM RLC entity, the transmitting side of the AM RLC entity shall:
    if the SN of the corresponding AMD PDU falls within the range VT(A) <= SN < VT(S):
        consider the AMD PDU or the portion of the AMD PDU for which a negative acknowledgement was received for retransmission.
    <... removed text...>

---

To implement the first alternative under this solution, Section 5.2.1 of 3GPP TS 36.322 could be revised as follows:

---
5.2.1 Retransmission
---
The transmitting side of an AM RLC entity can receive a negative acknowledgement (notification of reception failure by its peer AM RLC entity) for an AMD PDU or a portion of an AMD PDU by the following:
    STATUS PDU from its peer AM RLC entity.
When receiving a negative acknowledgement for an AMD PDU or a portion of an AMD PDU by a STATUS PDU from its peer AM RLC entity, the transmitting side of the AM RLC entity shall:
    if the SN of the corresponding AMD PDU falls within the range VT(A) <= SN < VT(S):
        consider the AMD PDU or the portion of the AMD PDU for which a negative acknowledgement was received for retransmission.
    The transmitting side of an AM RLC entity shall retain the entire AMD PDU for possible retransmission when a negative acknowledgement has been received for any portion of an AMD PDU. No portion of an AMD PDU shall be discarded until the entire AMD PDU has been positively acknowledged.
    <... removed text...>

---

To implement the second alternative under this solution, Section 5.2.1 of 3GPP TS 36.322 could be revised as follows:

---
5.2.1 Retransmission
---
The transmitting side of an AM RLC entity can receive a negative acknowledgement (notification of reception failure by its peer AM RLC entity) for an AMD PDU or a portion of an AMD PDU by the following:
    STATUS PDU from its peer AM RLC entity.
When receiving a negative acknowledgement for an AMD PDU or a portion of an AMD PDU by a STATUS PDU from its peer AM RLC entity, the transmitting side of the AM RLC entity shall:
    if the SN of the corresponding AMD PDU falls within the range VT(A) <= SN < VT(S):
        consider the AMD PDU or the portion of the AMD PDU for which a negative acknowledgement was received for retransmission.
    The transmitting side of an AM RLC entity shall retain the entire AMD PDU for possible retransmission when a

| 5.2.1 Retransmission |
| --- |
| negative acknowledgement has been received for any portion of an AMD PDU and the sequence number of that AMD PDU corresponds to the final NACK_SN field in the STATUS PDU.<br><. . . removed text . . .> |

Figure 11:
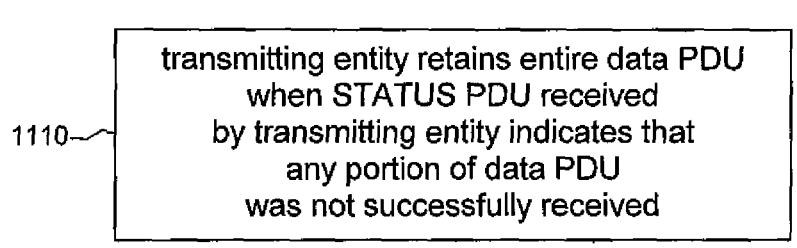
FIG. 11 illustrates a method for an acknowledged mode radio link control transmitting entity to promote the retransmission of a segment of a data protocol data unit according to an embodiment of the disclosure.

FIG. 11 illustrates an embodiment of a method for an acknowledged mode radio link control transmitting entity to promote the retransmission of a segment of a data protocol data unit. At block 1110, the transmitting entity retains the entire data protocol data unit when a STATUS protocol data unit received by the transmitting entity indicates that any portion of the data protocol data unit was not successfully received.

In a fourth solution, the receiving RLC entity indicates that not all of the missing segments for the RLC PDU corresponding to the final NACK_SN field in the STATUS report have been described within the STATUS report by setting the corresponding E1 field in the STATUS report to a specified value, such as "1". If the transmitting RLC entity detects that the E1 field equals the specified value, the transmitting entity does not immediately discard any portion of the RLC PDU indicated by the final NACK SN field. The receiving entity can then include information about the missing segments in the next STATUS report. The transmitting RLC entity waits for the next STATUS report to obtain more information about which remaining segments of that RLC PDU are still missing at the receiver. It is important to note that this condition be recognized as representing a valid STATUS PDU, and that the transmitting RLC entity must not discard such a STATUS PDU as containing "invalid" values (as described in Section 5.5.1 of 3GPP TS 36.322).

This solution might be used in conjunction with the third solution described above, where the transmitting side of an RLC entity keeps an entire RLC PDU for possible retransmission when any portion of that RLC PDU is indicated within a STATUS report as not successfully received. When the E1 field equals the specified value, the transmitting RLC entity could infer that the RLC PDU corresponding to the final NACK_SN field has at least one missing segment that was not included in the STATUS report. The transmitting RLC entity would know to retain that entire RLC PDU for possible future retransmission.

To implement this solution, Section 5.2.3 of 3GPP TS 36.322 could be revised as follows:

| 5.2.3 Status reporting |
| --- |
| <. . . removed text . . .><br>When constructing a STATUS PDU, the AM RLC entity shall:<br>    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:<br>        for an AMD PDU for which no byte segments have been received yet:<br>            include in the STATUS PDU a NACK_SN which is set to the SN of the AMD PDU;<br>        for a continuous sequence of byte segments of a partly received AMD PDU that have not been received yet:<br>            include in the STATUS PDU a set of NACK_SN, SOstart and SOend;<br>    if the final NACK_SN field in the STATUS PDU refers to a partly received AMD PDU and there is a not received segment of this AMD PDU which is not indicated in the STATUS PDU: |

| 5.2.3 Status reporting |
| --- |
|     set the E1 field associated with this NACK_SN to 1;<br>    set the ACK_SN to the SN of the next not received RLC Data PDU which is not indicated as missing in the resulting STATUS PDU. |

Figure 12:
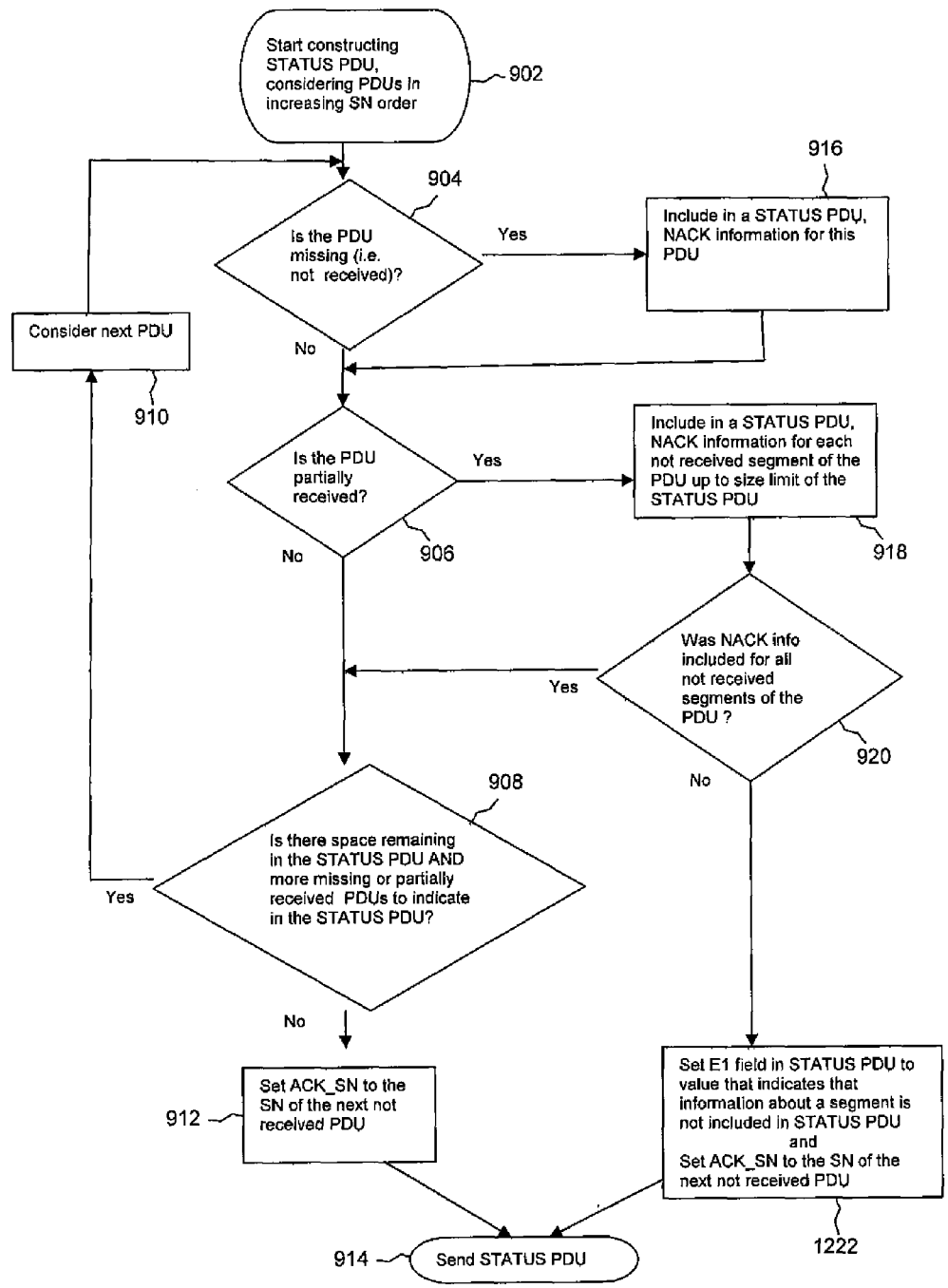
FIG. 12 illustrates an alternative method for an acknowledged mode radio link control receiving entity to promote the retransmission of a segment of a data protocol data unit according to an embodiment of the disclosure.

FIG. 12 illustrates an embodiment of a method for an acknowledged mode radio link control receiving entity to promote a retransmission of at least a segment of a data protocol data unit according to this solution. Blocks 902 through 920 are the same as in FIG. 9 and will not be described again here. If the answer is "no" at block 920, the flow proceeds to block 1222, where the E1 field in the STATUS PDU is set to a value that indicates that information about a segment of an RLC PDU is not included in the STATUS PDU, and the ACK_SN is set to the SN of the next not received PDU.

In a fifth solution, information for a partially received RLC PDU is included in a STATUS report only if there is sufficient space in the STATUS report to include information about all of the missing segments of that RLC PDU. If all of the missing segments cannot be described (due to insufficient resource space), then a NACK_SN field is included for that entire RLC PDU rather than for the missing segments. The ACK_SN field is set equal to the sequence number of the next missing (or partially missing) RLC PDU. This will result in the transmitting RLC entity retransmitting the entire RLC PDU for which some portions were already successfully received and some portions were not successfully received. However, this is expected to be a fairly rare event that should have a negligible impact on resource utilization efficiency.

To implement this solution, Section 5.2.3 of 3GPP TS 36.322 could be revised as follows:

| 5.2.3 Status reporting |
| --- |
| <. . . removed text . . .><br>When constructing a STATUS PDU, the AM RLC entity shall:<br>    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:<br>        for an AMD PDU for which no byte segments have been received yet:<br>            include in the STATUS PDU a NACK_SN which is set to the SN of the AMD PDU;<br>        for an AMD PDU that has been partly received:<br>            if all sets of NACK_SN, SOstart, SOend for this partly received AMD PDU fit within the STATUS PDU:<br>                include in the STATUS PDU a set of NACK_SN, SOstart and SOend for each continuous sequence of byte segments of this partly received AMD PDU;<br>            else, include in the STATUS PDU a NACK_SN which is set to the SN of the AMD PDU;<br>    set the ACK_SN to the SN of the next not received RLC Data PDU which is not indicated as missing in the resulting STATUS PDU. |

Figure 13:
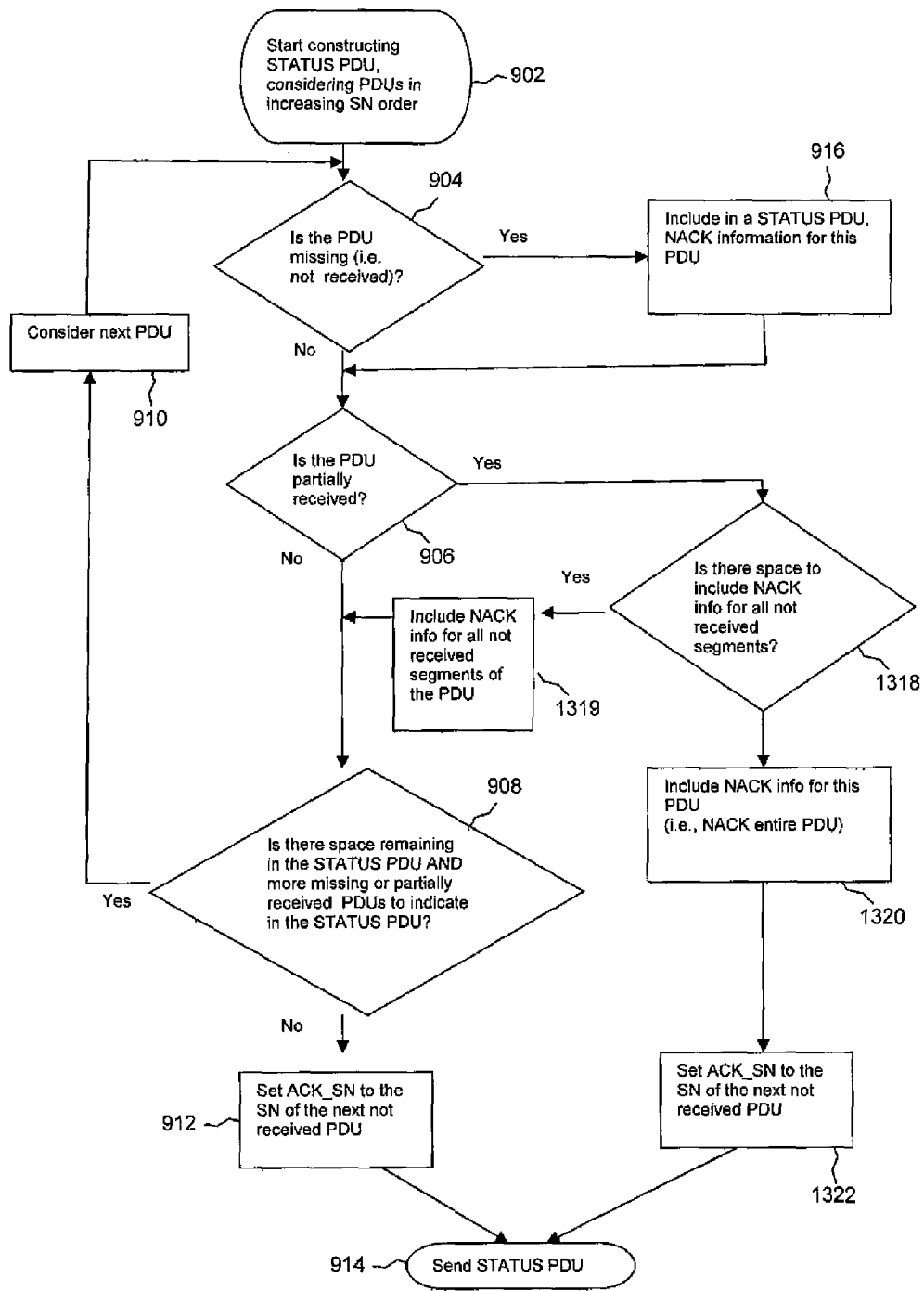
FIG. 13 illustrates an alternative method for an acknowledged mode radio link control receiving entity to promote the retransmission of a segment of a data protocol data unit according to an embodiment of the disclosure.

FIG. 13 illustrates an embodiment of a method for an acknowledged mode radio link control receiving entity to promote a retransmission of at least a segment of a data protocol data unit according to this solution. Blocks 902 through 916 are the same as in FIG. 9 and will not be described again here. If the answer is "yes" at block 906, the flow proceeds to block 1318, where it is determined whether there is space to include NACK information for all not received segments. If the answer is "yes", the flow proceeds to block 1319 where the NACK information for all the not received segments of the PDU is included in the STATUS PDU and then the flow returns to block 908. If the answer is "no", the flow proceeds to block 1320, where NACK information for this PDU is included. That is, the entire PDU is NACKed. The flow then proceeds to block 1322, where the ACK_SN is set to the SN of the next not received PDU.

The CPT (Control Packet Type) field in a STATUS PDU (as depicted in FIG. 6 and described in the table in FIG. 7) is typically set to 000 to indicate the presence of a STATUS PDU. The remaining CPT values (001-111) are reserved. In a sixth solution, one of these reserved CPT values is used to indicate a STATUS report in which the RLC PDU corresponding to the final NACK SN has missing segments that have not been fully described within the STATUS report. That is, this solution is similar to the fourth solution, except that in this case, it is the CPT field rather than the E1 field that indicates that the STATUS report does not include information about one or more segments that were not successfully received. For example, CPT=000 could indicate a normal STATUS report, and CPT=001 could indicate a STATUS report that has missing information.

This solution might be used in conjunction with the third solution described above, where the transmitting side of an RLC entity keeps an entire RLC PDU for possible retransmission when any portion of that RLC PDU is indicated within a STATUS report as not successfully received. When the CPT field equals 001, the transmitting RLC entity could infer that the RLC PDU corresponding to the final NACK SN field has at least one missing segment that was not included in the STATUS report. The transmitting RLC entity would know to retain that entire RLC PDU for possible future retransmission. Although it is proposed here that CPT=001 is used to indicate this "special" STATUS report, any of the other reserved values (010-111) could be used equally as well.

Implementation of this solution might entail revisions to Section 6.2.2.13 of 3GPP TS 36.322. Currently, this section is worded as follows:

6.2.2.13 Control PDU Type (CPT) field

Length: 3 bits.

The CPT field indicates the type of the RLC control PDU. The interpretation of the CPT field is provided in Table 6.2.2.13-1.

TABLE 6.2.2.13-1

CPT field interpretation

| Value | Description |
| --- | --- |
| 000 | STATUS PDU |
| 001-<br>111 | Reserved<br>(PDUs with this coding will be discarded by the receiving entity for this release of the protocol) |

To implement this solution, Section 6.2.2.13 of 3GPP TS 36.322 could be revised as follows:

6.2.2.13 Control PDU Type (CPT) field

Length: 3 bits.

The CPT field indicates the type of the RLC control PDU. The interpretation of the CPT field is provided in Table 6.2.2.13-1.

TABLE 6.2.2.13-1

CPT field interpretation

| Value | Description |
| --- | --- |
| 000 | STATUS PDU |
| 001 | STATUS PDU where the final NACK_SN RLC PDU has missing segments that have not been fully described |
| 010-<br>111 | Reserved<br>(PDUs with this coding will be discarded by the receiving entity for this release of the protocol) |

Figure 14:
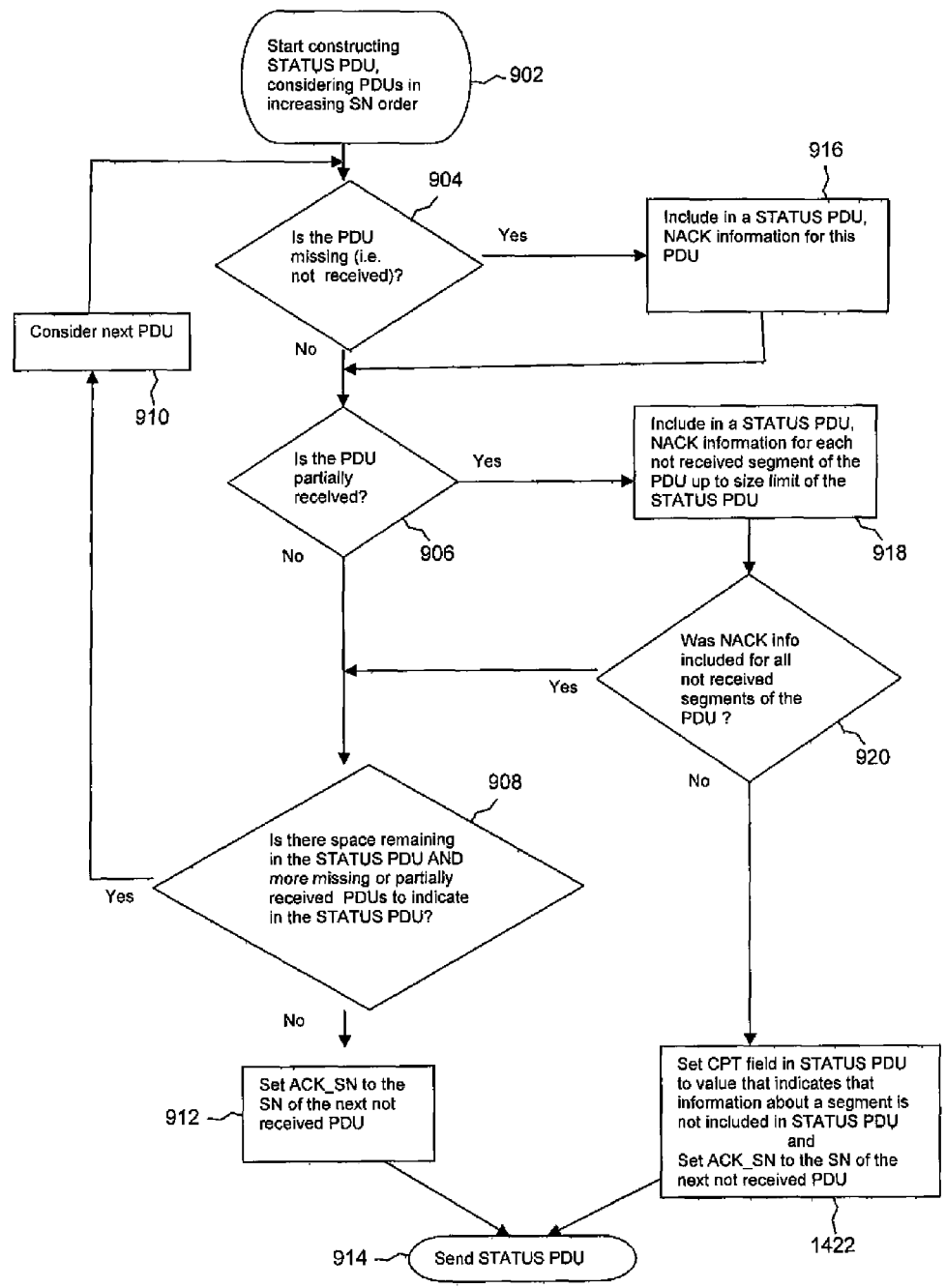
FIG. 14 illustrates an alternative method for an acknowledged mode radio link control receiving entity to promote the retransmission of a segment of a data protocol data unit according to an embodiment of the disclosure.

FIG. 14 illustrates an embodiment of a method for an acknowledged mode radio link control receiving entity to promote a retransmission of at least a segment of a data protocol data unit according to this solution. Blocks 902 through 920 are the same as in FIG. 9 and will not be described again here. If the answer is "no" at block 920, the flow proceeds to block 1422, where a Control Packet Type field in the STATUS PDU is set to a value that indicates that information about a segment of an RLC PDU is not included in the STATUS PDU, and the ACK_SN is set to the SN of the next not received PDU.

In a seventh solution, information for a partially received RLC PDU is always included in a STATUS report. If there is sufficient space in the STATUS report to include information about all of the missing segments of that RLC PDU, then all missing segments are included in the STATUS report. If there is not sufficient space in the STATUS report to include information about all of the missing segments of that RLC PDU, then multiple non-contiguous segments are consolidated into a smaller number of segments. The consolidated segments are included as the missing segments in the STATUS report. For example, when an RLC PDU is missing three non-contiguous segments, say (SOstart1, SOend1), (SOstart2, SOend2), (SOstart3, SOend3), but there is only enough space to include information about one missing segment, the missing segment that is reported in the STATUS report might be (SOstart1, SOend3). If there is enough space to include information about two missing segments, the missing segments that are reported in the STATUS report might be (SOstart1, SOend1), (SOstart2, SOend3). The ACK_SN field is set equal to the sequence number of the next missing (or partially missing) RLC PDU.

In other words, the NACK_SN for a plurality of segments that need to be retransmitted will include a starting point at the start of the first segment that needs to be retransmitted and an ending point at the end of the last segment that needs to be retransmitted. Intermediary starting and stopping points might be included if there is space for that information in the STATUS report. Any segments between the starting point and the ending point will be included in the NACK_SN and therefore will be retransmitted regardless of whether or not they were successfully transmitted in the previous transmission.

This might result in the transmitting RLC entity retransmitting only a partial RLC PDU. This may also lead to the retransmission of portions of the RLC PDU that may have already been successfully received by the receiving RLC entity. However, this is expected to be a fairly rare event that should have a negligible impact on resource utilization efficiency.

To implement this solution, Section 5.2.3 of 3GPP TS 36.322 could be revised as follows:

---
5.2.3 Status reporting
---
<... removed text ...>
When constructing a STATUS PDU, the AM RLC entity shall:
    for the AMD PDUs with SN such that VR(R) <= SN < VR(MS) that has not been completely received yet, in increasing SN order of PDUs and increasing byte segment order within PDUs, starting with SN = VR(R) up to the point where the resulting STATUS PDU still fits to the total size of RLC PDU(s) indicated by lower layer:
        for an AMD PDU for which no byte segments have been received yet:
            include in the STATUS PDU a NACK_SN which is set to the SN of the AMD PDU;
        for an AMD PDU that has been partly received:
            if all sets of NACK_SN, SOstart, SOend for this partly received AMD PDU fit within the STATUS PDU:
                include in the STATUS PDU a set of NACK_SN, SOstart and SOend for each continuous sequence of byte segments of this partly received AMD PDU;
            else, consolidate the non-contiguous multiple segments into fewer segments that can fit within STATUS PDU and report these consolidated segments in the STATUS report.
    set the ACK_SN to the SN of the next not received RLC Data PDU which is not indicated as missing in the resulting STATUS PDU.

---

Figure 15:
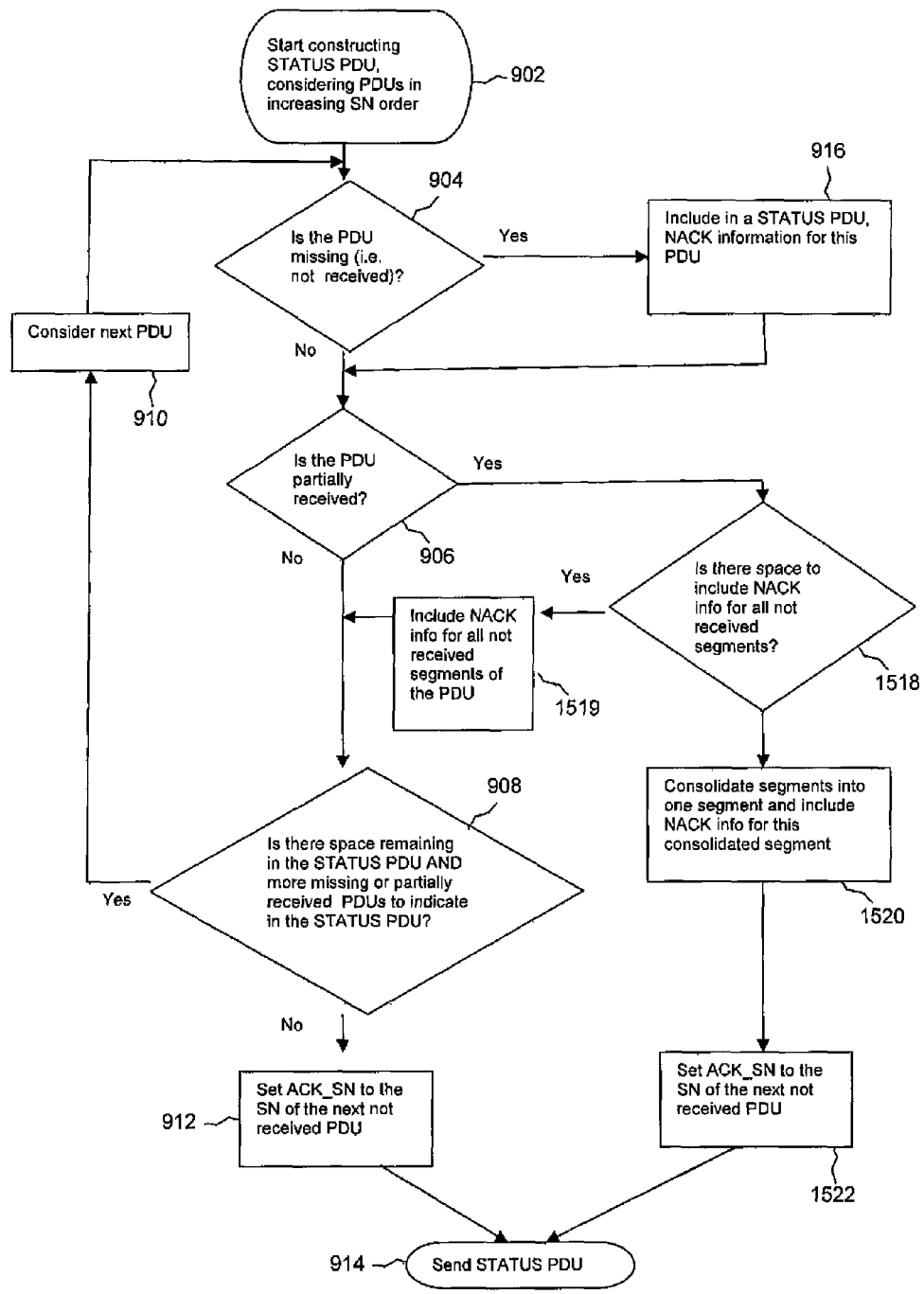
FIG. 15 illustrates an alternative method for an acknowledged mode radio link control receiving entity to promote the retransmission of a segment of a data protocol data unit according to an embodiment of the disclosure.

FIG. 15 illustrates an embodiment of a method for an acknowledged mode radio link control receiving entity to promote a retransmission of at least a segment of a data protocol data unit according to this solution. Blocks 902 through 916 are the same as in FIG. 9 and will not be described again here. If the answer is "yes" at block 906, the flow proceeds to block 1518, where it is determined whether there is space to include NACK information for all of the not received segments. If the answer is "yes", the flow proceeds to block 1519 where the NACK information for all the not received segments of the PDU is included in the STATUS PDU and then the flow returns to block 908. If the answer is "no", the flow proceeds to block 1520, where segments are consolidated into one segment, and NACK information for the consolidated segment is included in the STATUS PDU. The flow then proceeds to block 1522, where the ACK_SN is set to SN of the next not received PDU. A first number and a second number might be included in the STATUS PDU, the first number being a segment offset start (SOstart) of a first segment of the plurality of segments, and the second number being a segment offset end (SOend) of a last segment of the plurality of segments.

Figure 16:
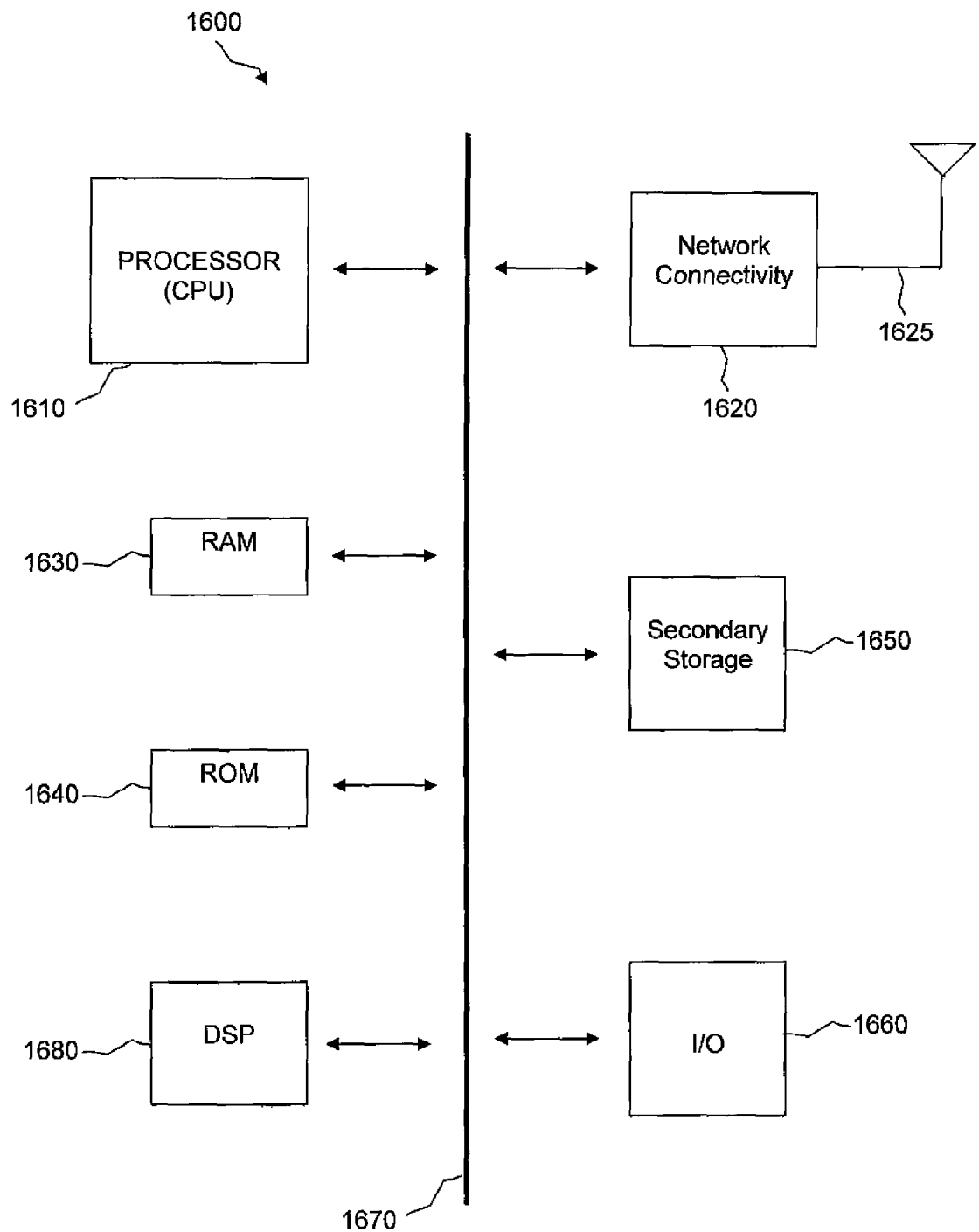
FIG. 16 illustrates a processor and related components suitable for implementing the several embodiments of the present disclosure.

The transmitting entity and receiving entity described above might include a processing component that is capable of executing instructions related to the actions described above. FIG. 16 illustrates an example of a system 1600 that includes a processing component 1610 suitable for implementing one or more embodiments disclosed herein. In addition to the processor 1610 (which may be referred to as a central processor unit or CPU), the system 1600 might include network connectivity devices 1620, random access memory (RAM) 1630, read only memory (ROM) 1640, secondary storage 1650, and input/output (I/O) devices 1660. These components might communicate with one another via a bus 1670. In some cases, some of these components may not be present or may be combined in various combinations with one another or with other components not shown. These components might be located in a single physical entity or in more than one physical entity. Any actions described herein as being taken by the processor 1610 might be taken by the processor 1610 alone or by the processor 1610 in conjunction with one or more components shown or not shown in the drawing, such as a digital signal processor (DSP) 1680. Although the DSP 1680 is shown as a separate component, the DSP 1680 might be incorporated into the processor 1610.

The processor 1610 executes instructions, codes, computer programs, or scripts that it might access from the network connectivity devices 1620, RAM 1630, ROM 1640, or secondary storage 1650 (which might include various disk-based systems such as hard disk, floppy disk, or optical disk). While only one CPU 1610 is shown, multiple processors may be present. Thus, while instructions may be discussed as being executed by a processor, the instructions may be executed simultaneously, serially, or otherwise by one or multiple processors. The processor 1610 may be implemented as one or more CPU chips.

The network connectivity devices 1620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1620 may enable the processor 1610 to communicate with the Internet or one or more telecommunications networks or other networks from which the processor 1610 might receive information or to which the processor 1610 might output information. The network connectivity devices 1620 might also include one or more transceiver components 1625 capable of transmitting and/or receiving data wirelessly.

The RAM 1630 might be used to store volatile data and perhaps to store instructions that are executed by the processor 1610. The ROM 1640 is a non-volatile memory device that typically has a smaller memory capacity than the memory capacity of the secondary storage 1650. ROM 1640 might be used to store instructions and perhaps data that are read during execution of the instructions. Access to both RAM 1630 and ROM 1640 is typically faster than to secondary storage 1650. The secondary storage 1650 is typically comprised of one or more disk drives or tape drives and might be used for non-volatile storage of data or as an over-flow data storage device if RAM 1630 is not large enough to hold all working data. Secondary storage 1650 may be used to store programs that are loaded into RAM 1630 when such programs are selected for execution.

The I/O devices 1660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1625 might be considered to be a component of the I/O devices 1660 instead of or in addition to being a component of the network connectivity devices 1620.

The following is incorporated herein by reference for all purposes: 3GPP TS 36.322.

In an embodiment, a method is provided for an acknowledged mode radio link control receiving entity to promote a retransmission of at least a segment of a data protocol data unit. The method includes the receiving entity constructing a STATUS protocol data unit such that an acknowledged mode radio link control transmitting entity receiving the STATUS protocol data unit retransmits the segment.

In an alternative embodiment, an acknowledged mode radio link control receiving entity is provided. The receiving entity includes a processor configured such that the receiving entity constructs a STATUS protocol data unit such that an acknowledged mode radio link control transmitting entity retransmits a segment of a data protocol data unit.

In an alternative embodiment, a method is provided for an acknowledged mode radio link control transmitting entity to promote the retransmission of a segment of a data protocol data unit. The method includes the transmitting entity retaining the entire data protocol data unit when a STATUS protocol data unit received by the transmitting entity indicates that any portion of the data protocol data unit was not successfully received.

In an alternative embodiment, an acknowledged mode radio link control transmitting entity is provided. The transmitting entity includes a processor configured such that the transmitting entity retains an entire data protocol data unit when a STATUS protocol data unit received by the transmitting entity indicates that any portion of the data protocol data unit was not successfully received.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for an acknowledged mode (AM) radio link control (RLC) receiving entity to promote a retransmission of at least one segment of a data protocol data unit (PDU), the method comprising:
constructing, by the receiving entity, a STATUS PDU such that an AM RLC transmitting entity receiving the STATUS PDU retransmits the at least one segment,
wherein the construction of the STATUS PDU includes setting an acknowledgment sequence number (ACK_SN) field in the STATUS PDU to a sequence number corresponding to the data PDU,
wherein the data PDU is partially received based on an initial transmission, and
wherein the STATUS PDU has insufficient space to describe all missing segments of the data PDU.

2. The method of claim 1, further comprising, omitting from the STATUS PDU a negative acknowledgment sequence number (NACK_SN) field for the data PDU.

3. The method of claim 1, further comprising, a transmitting entity keeping the entire data PDU for possible retransmission when the STATUS PDU indicates that at least a portion of the data PDU is not successfully received.

4. The method of claim 1, further comprising, a transmitting entity keeping the entire data PDU for possible retransmission when the STATUS PDU indicates that at least a portion of the data PDU is not successfully received and the data PDU sequence number corresponds to a final NACK_SN field in the STATUS PDU.

5. The method of claim 1, wherein the construction of the STATUS PDU comprises including in the STATUS PDU a NACK_SN field for the entire data PDU.

6. The method of claim 1, wherein the construction of the STATUS PDU comprises setting a field in the STATUS PDU to a value that indicates that information about a segment of the data PDU is not included in the STATUS PDU.

7. The method of claim 6, wherein the field is one of:
the E1 field; and
the Control Packet Type field.

8. The method of claim 1, wherein the construction of the STATUS PDU includes consolidating a plurality of segments into one segment for the purpose of constructing the STATUS PDU.

9. The method of claim 8, wherein the consolidation is performed by including a first number and a second number in the STATUS PDU, the first number being a segment offset start (SOstart) of a first segment of the plurality of segments, and the second number being a segment offset end (SOend) of a last segment of the plurality of segments.

10. An acknowledged mode (AM) radio link control (RLC) receiving entity, comprising:
a processor configured such that the receiving entity constructs a STATUS protocol data unit (PDU) such that an AM RLC transmitting entity retransmits at least one segment of a data PDU,
wherein the construction of the STATUS PDU includes setting an acknowledgment sequence number (ACK_SN) field in the STATUS PDU to a sequence number corresponding to the data PDU,
wherein the data PDU is partially received based on an initial transmission, and
wherein the STATUS PDU has insufficient space to describe all missing segments of the data PDU.

11. The receiving entity of claim 10, further comprising, omitting from the STATUS PDU a negative acknowledgment sequence number (NACK_SN) field for the data PDU.

12. The receiving entity of claim 10, further comprising, a transmitting entity keeping the entire data PDU for possible retransmission when the STATUS PDU indicates that at least a portion of the data PDU is not successfully received.

13. The receiving entity of claim 10, further comprising, a transmitting entity keeping the entire data PDU for possible retransmission when the STATUS PDU indicates that at least a portion of the data PDU is not successfully received and the data PDU sequence number corresponds to a final NACK_SN field in the STATUS PDU.

14. The receiving entity of claim 10, wherein the construction of the STATUS PDU comprises including in the STATUS PDU a NACK_SN field for the entire data PDU.

15. The receiving entity of claim 10, wherein the construction of the STATUS PDU comprises setting a field in the STATUS PDU to a value that indicates that information about a segment of the data PDU is not included in the STATUS PDU.

16. The receiving entity of claim 15, wherein the field is one of:
the E1 field; and
the Control Packet Type field.

17. The receiving entity of claim 10, wherein the construction of the STATUS PDU includes consolidating a plurality of segments into one segment for the purpose of constructing the STATUS PDU.

18. The receiving entity of claim 17, wherein the consolidation is performed by including a first number and a second number in the STATUS PDU, the first number being a segment offset start (SOstart) of a first segment of the plurality of segments, and the second number being a segment offset end (SOend) of a last segment of the plurality of segments.

19. A method for an acknowledged mode (AM) radio link control (RLC) receiving entity to promote a retransmission of at least one segment of a data protocol data unit (PDU), the method comprising:
- constructing, by the receiving entity, a STATUS PDU such that an AM RLC transmitting entity receiving the STATUS PDU retransmits the at least one segment,
  - wherein the construction of the STATUS PDU includes setting an acknowledgment sequence number (ACK_SN) field in the STATUS PDU to a sequence number corresponding to the data PDU and includes omitting from the STATUS PDU a negative acknowledgment sequence number (NACK_SN) field for the data PDU when there is insufficient space to describe all missing segments of the data PDU,
  - wherein the data PDU is partially received based on an initial transmission, and
  - wherein the STATUS PDU has insufficient space to describe all missing segments of the data PDU.

20. An acknowledged mode (AM) radio link control (RLC) receiving entity, comprising:
- a processor configured such that the receiving entity constructs a STATUS protocol data unit (PDU) such that an AM RLC transmitting entity retransmits at least one segment of a data PDU,
  - wherein the construction of the STATUS PDU includes setting an acknowledgment sequence number (ACK_SN) field in the STATUS PDU to a sequence number corresponding to the data PDU and includes omitting from the STATUS PDU a negative acknowledgment sequence number (NACK_SN) field for the data PDU when there is insufficient space to describe all missing segments of the data PDU,
  - wherein the data PDU is partially received based on an initial transmission, and
  - wherein the STATUS PDU has insufficient space to describe all missing segments of the data PDU.

* * * * *